US011084115B2

(12) United States Patent
Nelson (10) Patent No.: US 11,084,115 B2
(45) Date of Patent: Aug. 10, 2021

(54) COOLING FOR INVERTER-BASED ENGINE-DRIVEN WELDING-TYPE POWER SUPPLY

(71) Applicant: Illinois Tool Works Inc., Glenview, IL (US)

(72) Inventor: Jonathon Nelson, Menasha, WI (US)

(73) Assignee: ILLINOIS TOOL WORKS INC., Glenview, IL (US)

( * ) Notice: Subject to any disclaimer, the term of this patent is extended or adjusted under 35 U.S.C. 154(b) by 465 days.

(21) Appl. No.: 15/692,112

(22) Filed: Aug. 31, 2017

(65) Prior Publication Data

US 2019/0061036 A1    Feb. 28, 2019

(51) Int. Cl.
| B23K 9/10 | (2006.01) |
| B23K 37/00 | (2006.01) |
| B23K 9/32 | (2006.01) |
| F02B 63/04 | (2006.01) |

(52) U.S. Cl.
CPC .............. B23K 9/1006 (2013.01); B23K 9/32 (2013.01); B23K 37/003 (2013.01); F02B 63/044 (2013.01)

(58) Field of Classification Search
CPC ...... B23K 37/003; B23K 9/1006; B23K 9/32; F02B 63/044
USPC ...... 219/133, 86.31, 120, 136, 130.4, 130.5, 219/134, 137 PS, 61.7, 76.11, 125.11, 219/126, 130.1, 130.51; 310/153, 187, 310/198, 254; 165/80.3, 104.33, 121, 165/122, 185; 361/697, 679.47, 690, 695, 361/600, 668, 699, 601, 622, 623, 641, 361/818, 836, 704–707, 717–719, 816
See application file for complete search history.

(56) References Cited

U.S. PATENT DOCUMENTS

| 5,624,589 A | * | 4/1997 | Latvis | ...................... | B23K 9/32 |
| | | | | | 219/133 |
| 6,081,423 A | * | 6/2000 | Griffin | ................. | B23K 9/1006 |
| | | | | | 361/688 |
| 8,643,984 B2 | * | 2/2014 | Kawakita | .................. | F02C 7/12 |
| | | | | | 361/37 |
| 9,474,185 B2 | | 10/2016 | Jochman | | |

(Continued)

FOREIGN PATENT DOCUMENTS

| EP | 3124152 A1 | 2/2017 |
| WO | 2008134182 | 11/2008 |

(Continued)

OTHER PUBLICATIONS

Int'l Search Report and Written Opinion for Appln No. PCT/US2018/047469 dated Dec. 14, 2018 (13 pages).

(Continued)

*Primary Examiner* — Dana Ross
*Assistant Examiner* — Ket D Dang
(74) *Attorney, Agent, or Firm* — McAndrews, Held & Malloy, Ltd.

(57) ABSTRACT

A welder-generator comprising an engine operatively coupled to a generator, weld circuitry, and a cooling system. The generator is configured to produce an electrical signal. The weld circuitry includes inverter circuitry configured to control characteristics of the electrical signal. A cooling system is configured to substantially block heat generated by operation of the engine from being transmitted to the weld circuitry.

20 Claims, 12 Drawing Sheets

(56) References Cited

U.S. PATENT DOCUMENTS

| | | | |
|---|---|---|---|
| 2006/0027547 A1* | 2/2006 | Silvestro | B23K 9/323 |
| | | | 219/133 |
| 2009/0159577 A1 | 6/2009 | Sommerfeld | |
| 2010/0012636 A1* | 1/2010 | Jochman | H05K 7/20145 |
| | | | 219/133 |
| 2010/0147817 A1* | 6/2010 | Laitala | B23K 9/1006 |
| | | | 219/133 |
| 2010/0314372 A1* | 12/2010 | DuVal | B23K 9/1006 |
| | | | 219/133 |
| 2011/0222243 A1* | 9/2011 | Nagami | B23K 9/1006 |
| | | | 361/697 |
| 2015/0273608 A1* | 10/2015 | Rozmarynowski | B23K 9/1012 |
| | | | 219/133 |
| 2016/0129517 A1* | 5/2016 | Altekruse | B23K 9/325 |
| | | | 219/130.1 |
| 2017/0034957 A1 | 2/2017 | Jochman | |

FOREIGN PATENT DOCUMENTS

| | | |
|---|---|---|
| WO | 2010050480 | 5/2010 |
| WO | 2012100635 | 8/2012 |
| WO | 2015048544 | 4/2015 |

OTHER PUBLICATIONS

Int'l Search Report and Written Opinion for Appln No. PCT/US2017/029655 dated Aug. 24, 2017 (15 pages).

\* cited by examiner

COOLING FOR INVERTER-BASED ENGINE-DRIVEN WELDING-TYPE POWER SUPPLY

TECHNICAL FIELD

The present disclosure relates to an engine-driven welding-type power supply. Specifically, the disclosure relates to an inverter-based, engine-driven welding-type power supply with improved cooling.

BACKGROUND

Manual welding operations sometimes use an engine-driven welding-type power supplies to power the welding process. Conventional engine-driven welding-type power supplies place portions of the components inside an enclosure, which provides a protective barrier for the equipment and the operators. However, the enclosure may also trap heat.

The engine in the engine-driven welding-type power supplies typically produces non-trivial amounts of heat. In some circumstances, the heat produced by the engine may affect components in the enclosure.

In view of the foregoing, a need exists for improved welder-generator heat management.

SUMMARY

Engine-driven welding-type power supplies with improved cooling are disclosed, substantially as illustrated by, and described in connection with, at least one of the figures, as set forth more completely in the claims.

DESCRIPTION OF THE DRAWINGS

These and other advantages of the present disclosure may be readily understood with the reference to the following specifications and attached drawings wherein.

DETAILED DESCRIPTION

Preferred embodiments of the present disclosure may be described hereinbelow with reference to the accompanying drawings. In the following description, well-known functions or constructions are not described in detail because they may obscure the disclosure in unnecessary detail. For this disclosure, the Miming terms and definitions shall apply.

As utilized herein, "and/or" means any one or more of the items in the list joined by "and/or". As an example, "x and/or y" means any element of the three-element set {(x), (y), (x, y)}. In other words, "x and/or y" means "one or both of x and y". As another example, "x, y, and/or z" means any element of the seven-element set {(x), (y), (z), (x, y), (x, z), (y, z), (x, y, z)}. In other words, "x, y and/or z" means "one or more of x, y and z".

As utilized herein the terms "circuits" and/or "circuitry" refer to physical electronic components (i.e. hardware), such as, for example analog and/or digital components, power and/or control elements, and/or a microprocessor, as well as any software and/or firmware ("code") which may configure the hardware, be executed by the hardware, and or otherwise be associated with the hardware.

As used herein, power conversion circuitry refers to circuitry and/or electrical components that convert electrical power from one or more first forms (e.g., power output by a generator) to one or more second forms having any combination of voltage, current, frequency, and/or response characteristics. The power conversion circuitry may include safety circuitry, output selection circuitry, measurement and/or control circuitry, and/or any other circuits to provide appropriate features.

As utilized herein, the terms "e.g." and "for example" set off lists of one or more non-limiting examples, instances, or illustrations.

As used herein, the term "substantially" means mostly, largely, and/or considerably, such that small and/or reasonably minor exceptions and/or deviations may remain within the scope of contemplation.

As used herein, the words "about" and "approximately," when used to modify or describe a value (or range of values), mean reasonably close to that value or range of values. Thus, the embodiments described herein are not limited to only the recited values and ranges of values, but rather should include reasonably workable deviations.

Welding-type power, as used herein, refers to power suitable for welding, plasma cutting, induction heating, CAC-A and/or hot wire welding/preheating (including laser welding and laser cladding).

As used herein, the term "coupled" means attached, affixed, connected, joined, fastened, linked, and/or otherwise secured.

As used herein, "operatively coupled" means that a number of elements or assemblies are coupled together, such that as a first element/assembly moves from one position (and/or state, configuration, orientation etc.) to another, a second element/assembly that is operatively coupled to the first element/assembly also moves between one position (and/or state, configuration, orientation etc.) to another. It is noted that a first element may be "operatively coupled" to a second element without the opposite being true.

Disclosed example engine-driven welding-type power supplies include an engine operatively coupled to a generator, weld circuitry, and a cooling system. The generator is configured to produce an electrical signal. The weld circuitry includes inverter circuitry configured to control characteristics of the electrical signal. The cooling system is configured to substantially block heat generated by operation of the engine from being transmitted to the weld circuitry.

In some examples, the cooling system includes a first fan configured to urge air along a first airflow path, and a second fan configured to urge air along a second airflow path. At least a portion of the first airflow path is substantially adjacent to the weld circuitry, and at least a portion of the second airflow path is substantially adjacent to the weld circuitry. In some examples the second airflow path is at least partially defined by one or more of the generator or the engine. In some examples the first and second airflow paths cooperate to create an air barrier that at least partially shields the weld circuitry from heat produced by the engine. In some examples the second fan is operatively coupled to the generator and the first fan is operatively coupled to the weld circuitry. In some examples, the second fan is configured to rotate about an axis defined by a rotor shaft, wherein the rotor shaft operatively couples the generator to the engine. In some examples the weld circuitry is positioned within an enclosure. In some examples the inverter circuitry comprises a switched mode power supply.

Disclosed example power systems have an improved airflow, and include an enclosure, an engine, a fuel tank, a generator configured to produce power, weld power conversion circuitry disposed within the enclosure, and first and second airflow paths at least partially defined by the enclosure. The weld power conversion circuitry is configured to convert generator power to welding-type power. The first airflow path extends from a first inlet positioned at a first location in the enclosure to a first air outlet positioned at a second location in the enclosure. The second airflow path extends from a second inlet positioned at a third location in the enclosure to a second outlet positioned at a fourth location.

In some examples, the second airflow path is at least partially defined by one or more of the generator or the engine. In some examples both the first and second airflow paths pass substantially adjacent to the weld power conversion circuitry. In some examples, the first location is a sidewall of the enclosure and the second location is an opposite sidewall of the enclosure. In some examples, the third location is a front wall of the enclosure, a rear wall of the enclosure, or a top of the enclosure. In some examples, the second airflow path routes air adjacent to the fuel tank, adjacent to the weld power conversion circuitry, and through the generator. In some examples, the second airflow path routes air adjacent to the fuel tank, adjacent to the weld power conversion circuitry, and through the generator, in order. In some examples, a fan is operatively coupled to the weld power conversion circuitry, and configured to urge air through the first airflow path. In some examples, a fan is operatively coupled to the generator, and configured to urge air through the second airflow path. In some examples, the fan is configured to rotate about an axis defined by a rotor shaft that operatively couples the generator to the engine. In some examples, the weld power conversion circuitry comprises a switched mode power supply. In some examples, the first and second airflow paths are configured to cool the switched mode power supply.

Disclosed examples include engine-driven welding-type power supplies having an improved construction and configuration that simplifies machine design and has airflow paths to cool a switched mode power supply inverter-based weld module (also referred to interchangeably as an "inverter-based" weld module). An inverter-based weld module may be used in place of standard coil wound weld components to allow the overall weight and cost of the unit to be significantly decreased. However, inverter-based weld modules may be more heat sensitive than traditional weld modules, with a lower critical temperature, for example. Disclosed example engine-driven welding-type power supplies provide improved thermal management to keep the weld module sufficiently cooled (e.g., below a threshold and/or critical temperature).

Disclosed example engine-driven welding-type power supplies use multiple air flow paths to cool an inverter-based weld module. Air is routed along a first airflow path through air intakes and/or inlets, vents, openings, grates, griddles, etc.) in the side of the enclosure, through the weld module, and out through air exhausts in the opposite side of the enclosure. Air is also routed along a second airflow path through air intakes in the rear of the enclosure, over the fuel tank, across the back side of the weld module, through the generator and then exiting through the generator barrel. In the disclosed example, a generator fan is repurposed to urge air along the second airflow path, and a weld module cooling fan urges air along the first flow path. The integration of multiple air flow paths may provide sufficient cooling to allow the use of an inverter-based weld module, which increase the weld quality of the unit.

FIGS. 1-5 illustrate an example engine-driven welding-type power supply 100. The engine-driven welding-type power supply 100 includes an outer frame 102 (and/or chassis, mount, skeleton). An enclosure 104 (and/or housing, cover, shell, casing etc.) is coupled to the frame and fit within the general confines of the frame. The enclosure 104 has a front face 106, a rear face 108 (opposite the front face 106), a left sidewall 110, and a right sidewall 112 (opposite the left sidewall 110). The enclosure 104 includes louvers 114 (and/or vents, slats, openings, apertures, etc.) on the left sidewall 110, the right sidewall 112, and the rear face 108.

A weld module 116 is positioned within and coupled to the enclosure 104, near and/or substantially adjacent to the front face 106 of the enclosure 104. The example weld module 116 includes weld power conversion circuitry. The weld power conversion circuitry may be mounted on circuit boards and/or other retainers, and coupled to the sides of the enclosure 104 by brackets, for example, and/or otherwise coupled to the enclosure 104. The power conversion circuitry may take an alternating current (AC) or direct current (DC) electric signal, and convert it to an AC or DC signal, and/or to a different frequency. The example weld module 116 includes inverter-based power conversion circuitry, such as inverter-based power conversion circuitry comprising a switched mode power supply. The weld module 116 may provide one or more types of electrical power suitable for specific and/or general purpose uses, such as welding-type power, 110 VAC and/or 220 VAC power, battery charging power, and/or any other type of electrical power.

Figure 1:
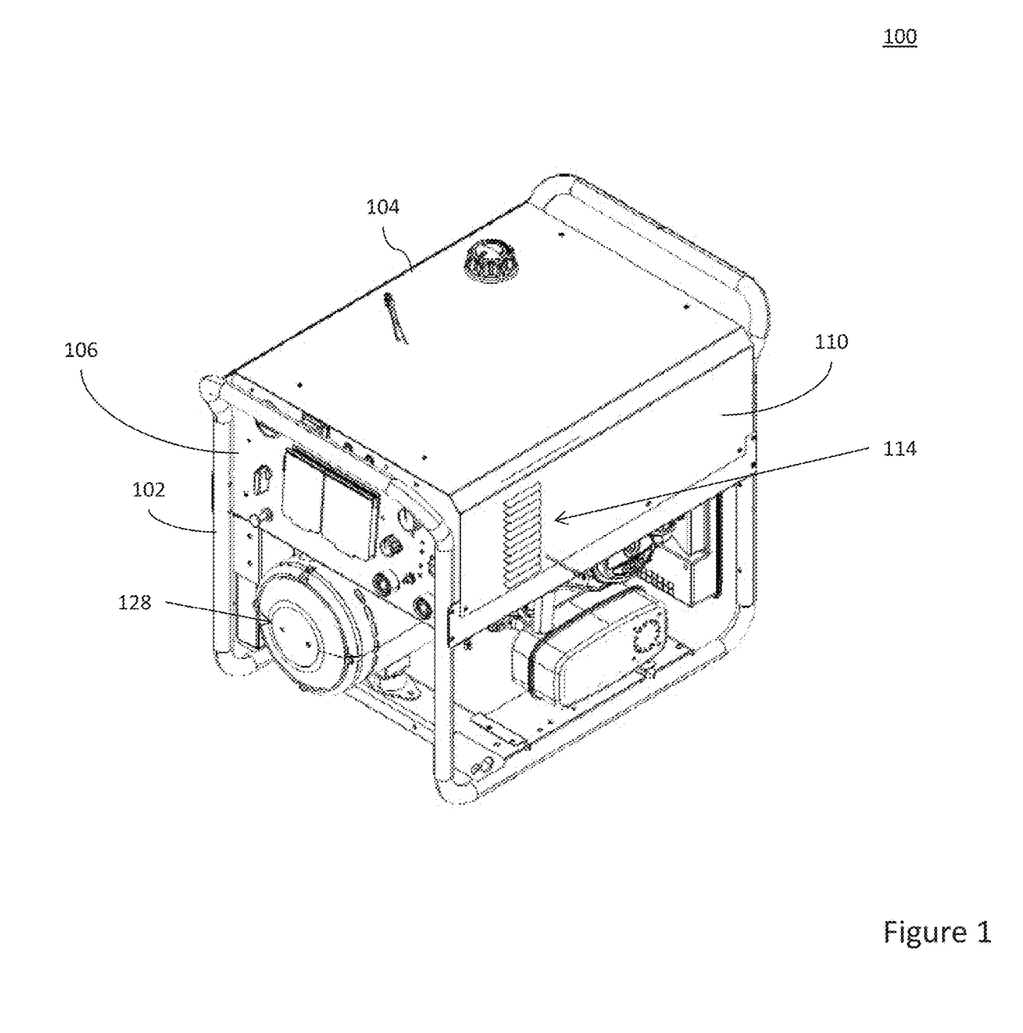
FIG. 1 is a perspective view of an example engine-driven welding-type power supply, in accordance with the present disclosure.
Figure 2:
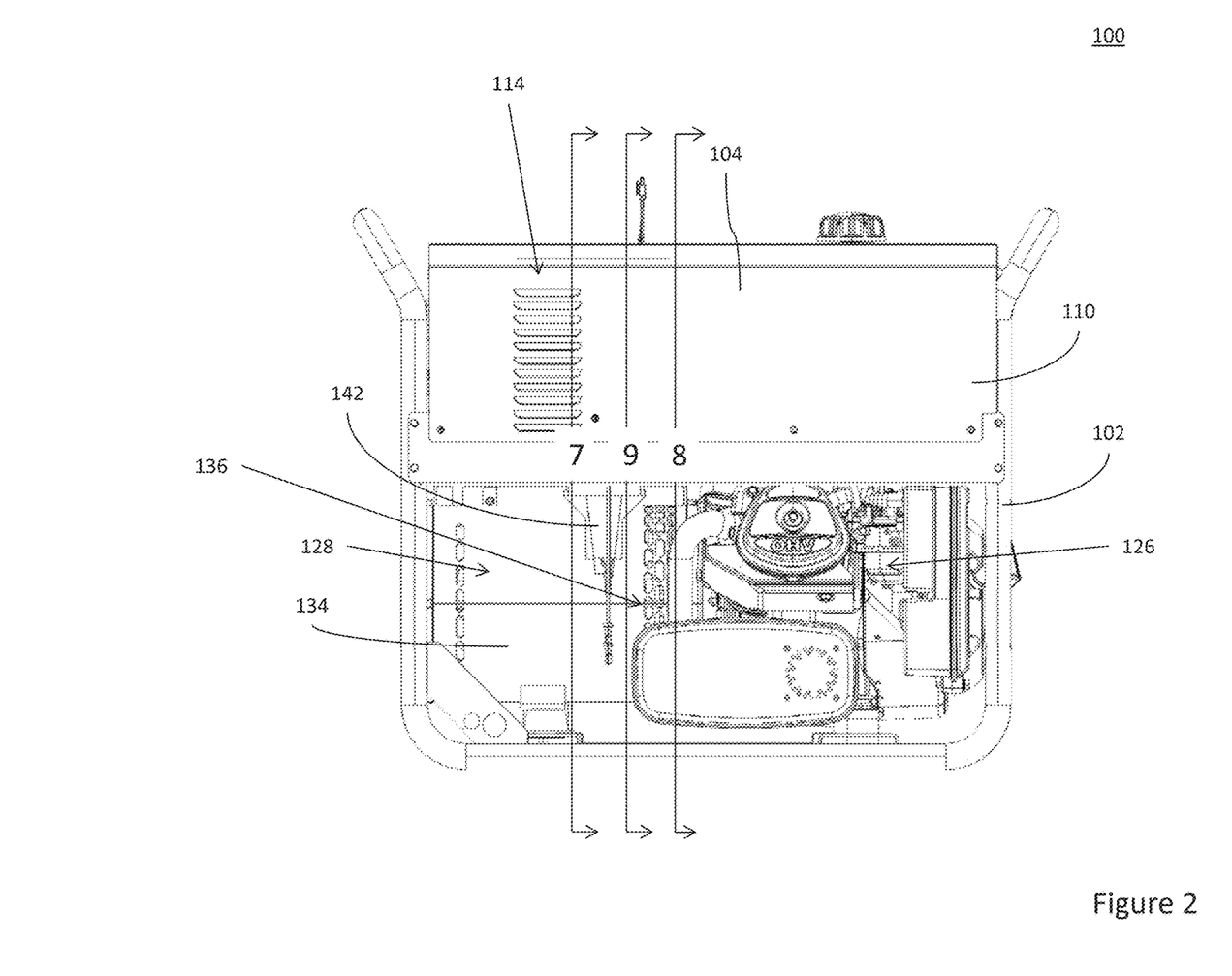
FIG. 2 is a left side view of the engine-driven welding-type power supply of FIG.
Figure 3:
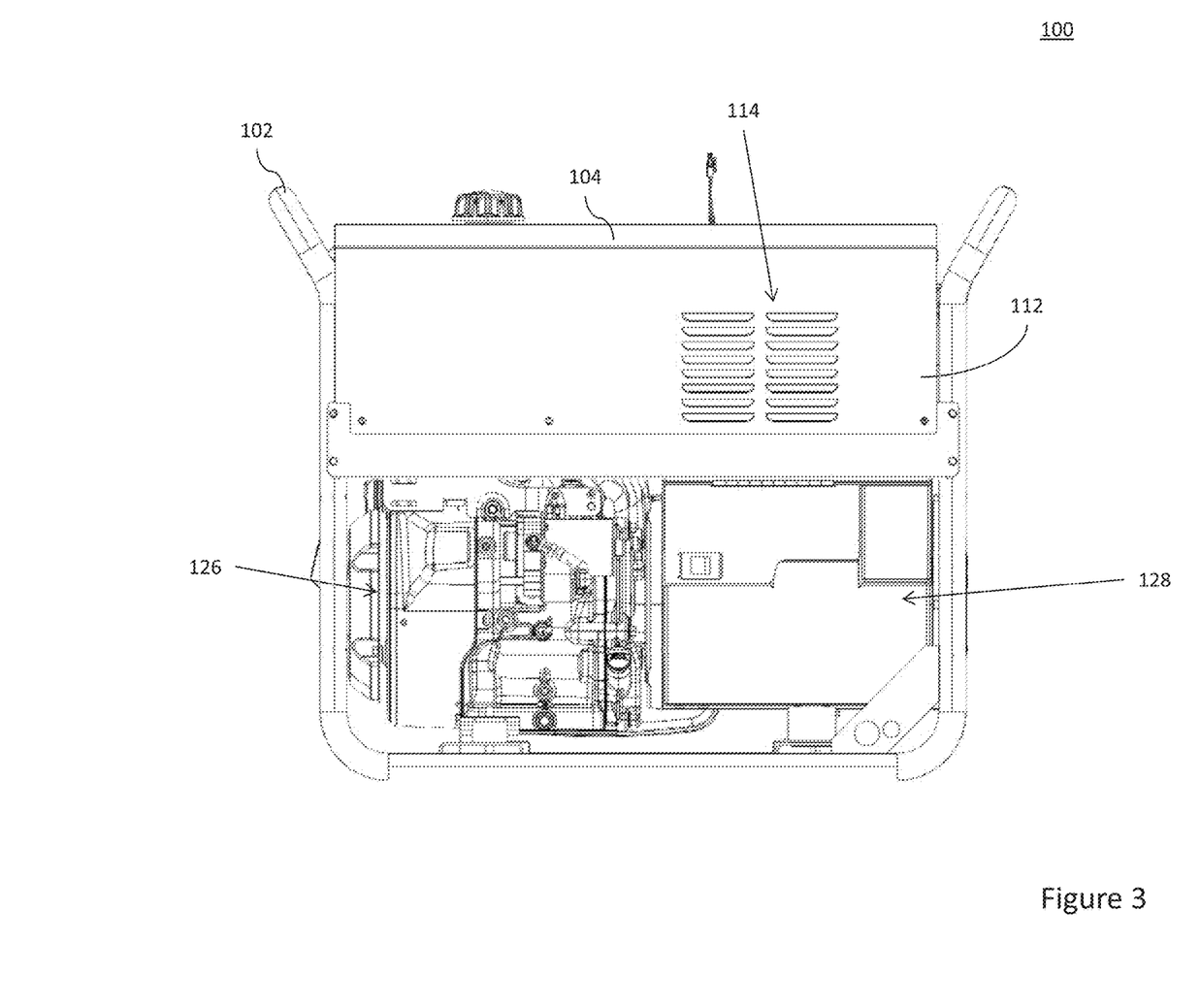
FIG. 3 is a right side view of the engine-driven welding-type power supply of FIG. 1.
Figure 4:
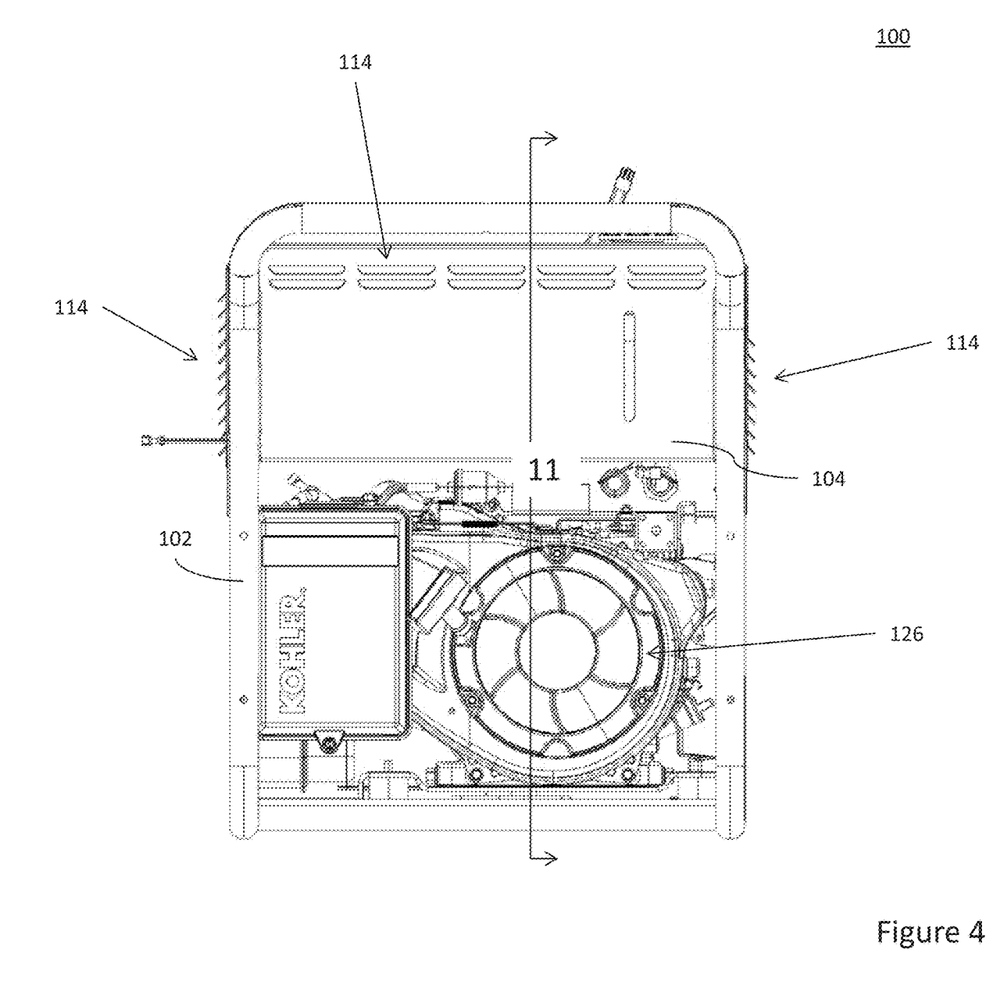
FIG. 4 is a rear view of the engine-driven welding-type power supply of FIG. 1.
Figure 5:
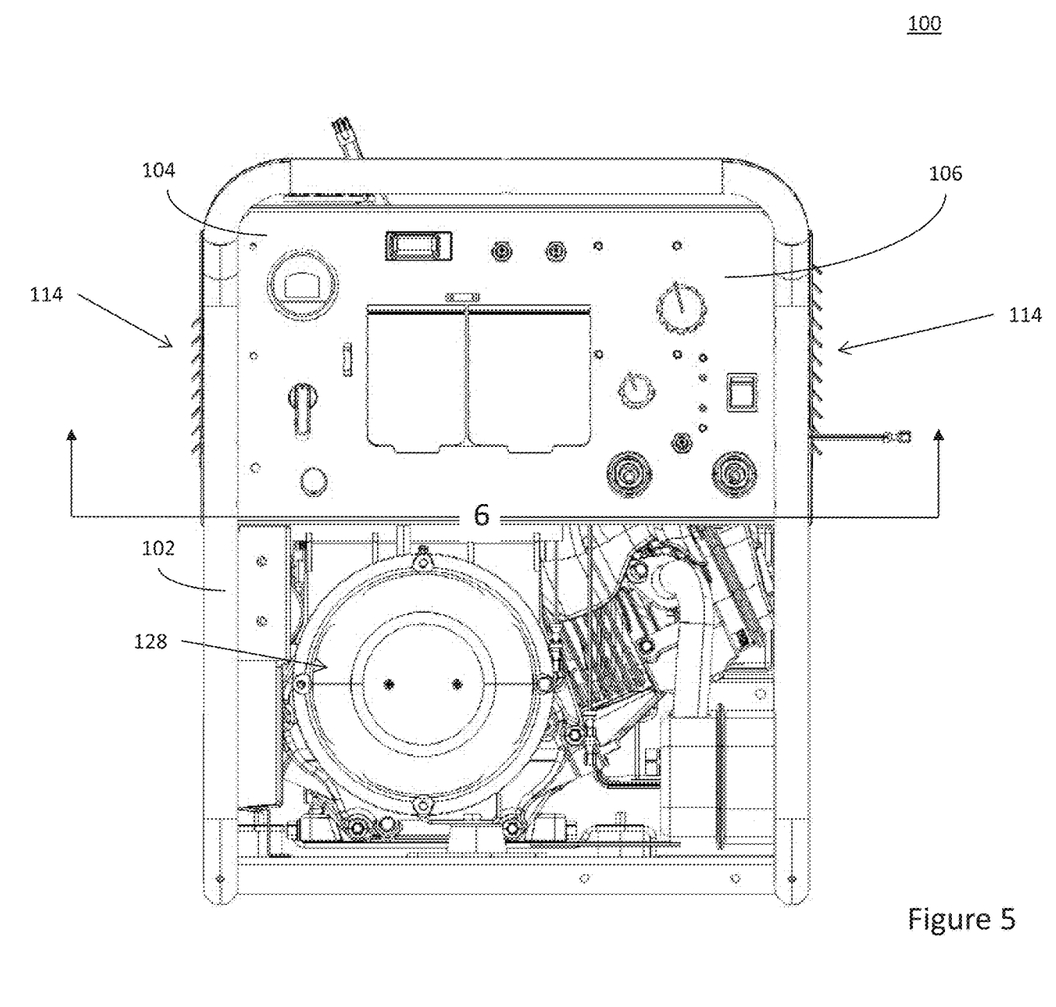
FIG. 5 is a front view of the engine-driven welding-type power supply of FIG. 1.
Figure 6:
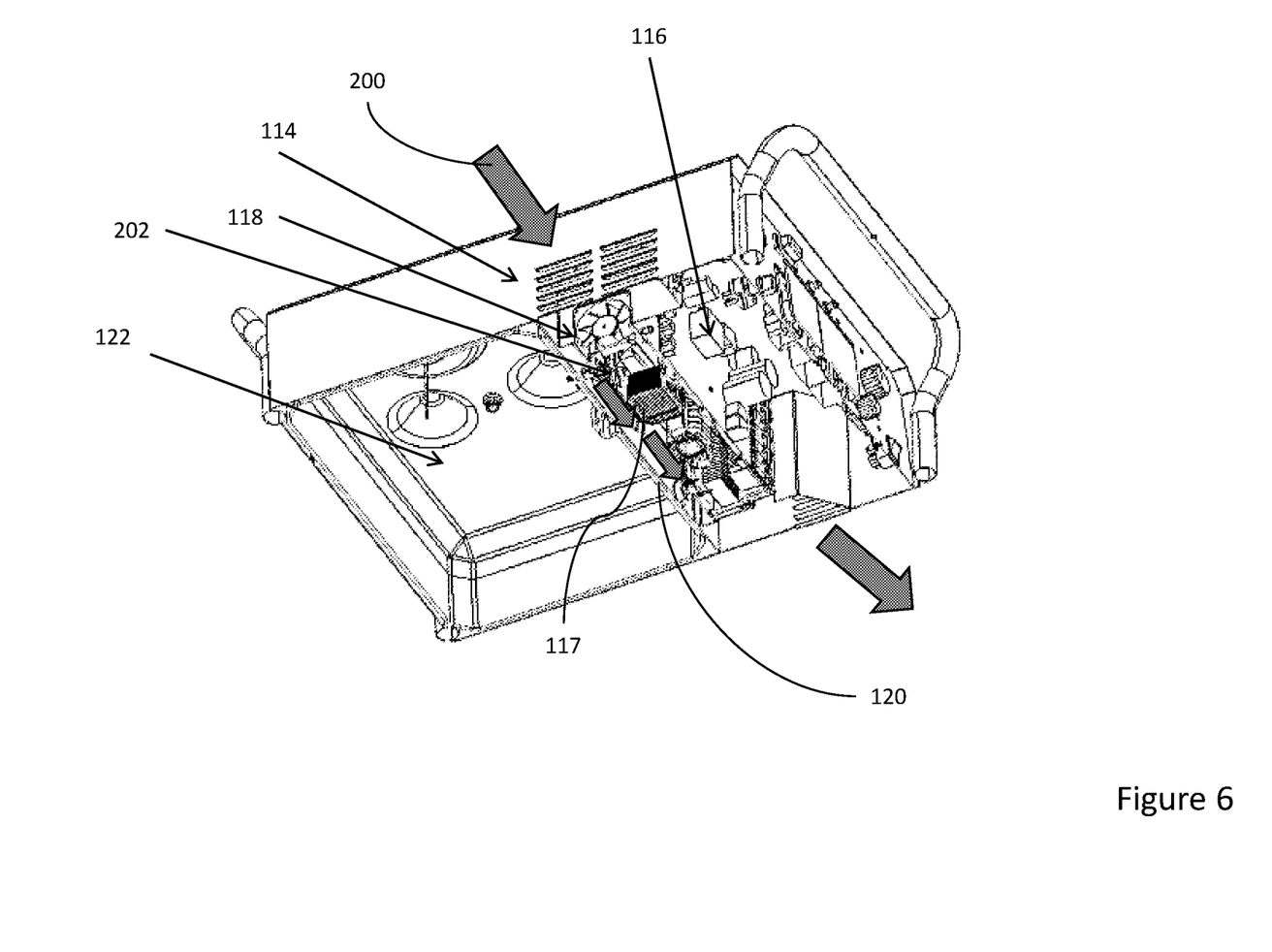
FIG. 6 is a cross section of the engine-driven welding-type power supply of FIG. 1, viewed at an angle from below.
Figure 7:
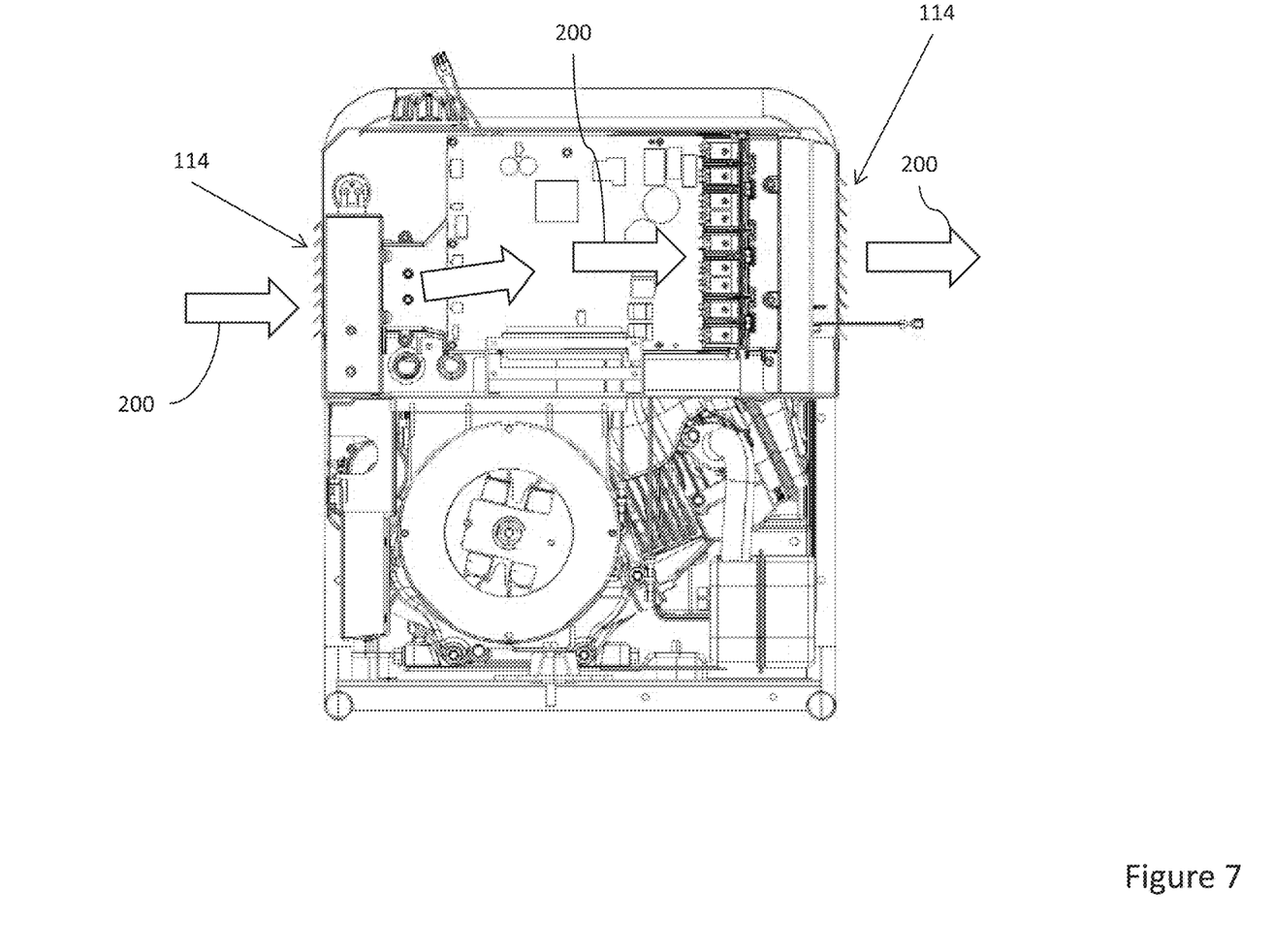
FIG. 7 is a cross section of the engine-driven welding-type power supply of FIG. 1, viewed from the front.

As shown in FIGS. 6 and 7, the weld module 116 is positioned between the louvers 114 on the left sidewall 110 and the right sidewall 112 of the enclosure 104. An airflow path 200 is formed between the louvers 114 on the left sidewall. 110 and the right sidewall 112 of the enclosure 104 in order to help cool the weld module 116. The air flowing through the airflow path 200 passes substantially adjacent to the weld module 116 and its circuitry. More particularly, the airflow path 200 flows through a wind tunnel 202 that is physically separate from the weld module 116, but is thermally coupled to the weld module 116 via one or more heat sinks 117 (and/or heat exchangers, and/or other thermal coupling devices). Physical separation of the airflow path 200 from the circuitry in the weld module 116 reduces the exposure of the weld module 116 to debris from the environment outside the enclosure 104. In other examples, the airflow path 200 may flow directly over the components of the weld module 116. Thus, air flowing along the airflow path 200 may help cool the weld module 116 by cooling the thermally coupled heat sinks 117, and/or by continually moving heat and/or heated air out of the enclosure 104 through the louvers on one sidewall, and drawing cooler air into the enclosure 104 through the louvers 114 on the other sidewall.

The engine-driven welding-type power supply 100 includes a fan 118 to assist in moving air along the airflow path 200. As shown in FIG. 6, the fan 118 is positioned in the enclosure 104 near the louvers 114 on the right sidewall 112 of the enclosure 104. While the fan 118 is shown near the louvers 114 on the right sidewall 112 of the enclosure 104, persons of ordinary skill will understand the fan 118 may alternatively be included near the louvers 114 on the left sidewall 110 of the enclosure 104. As a further alternative, multiple fans may be used.

The fan 118 may be operatively coupled to the weld module 116 and/or the enclosure 104. The fan 118 may use electric power routed to the weld module 116 to power its operation. The fan 118 is configured to urge and/or move, pull, force, suction etc.) air into the enclosure 104 through the louvers 114 near the fan 118, using those louvers 114 as inlets. The force from the fan 118 urges (and/or move, push, force, etc.) the air adjacent to the weld module 116. More particularly, the fan 118 urges air through the wind tunnel 202, across and/or adjacent the heat sinks 117 in thermal communication with the weld module 116, and then out of the enclosure 104 through the louvers 114 on the opposite sidewall, using those louvers 114 as outlets and/or exhausts).

Figure 8:
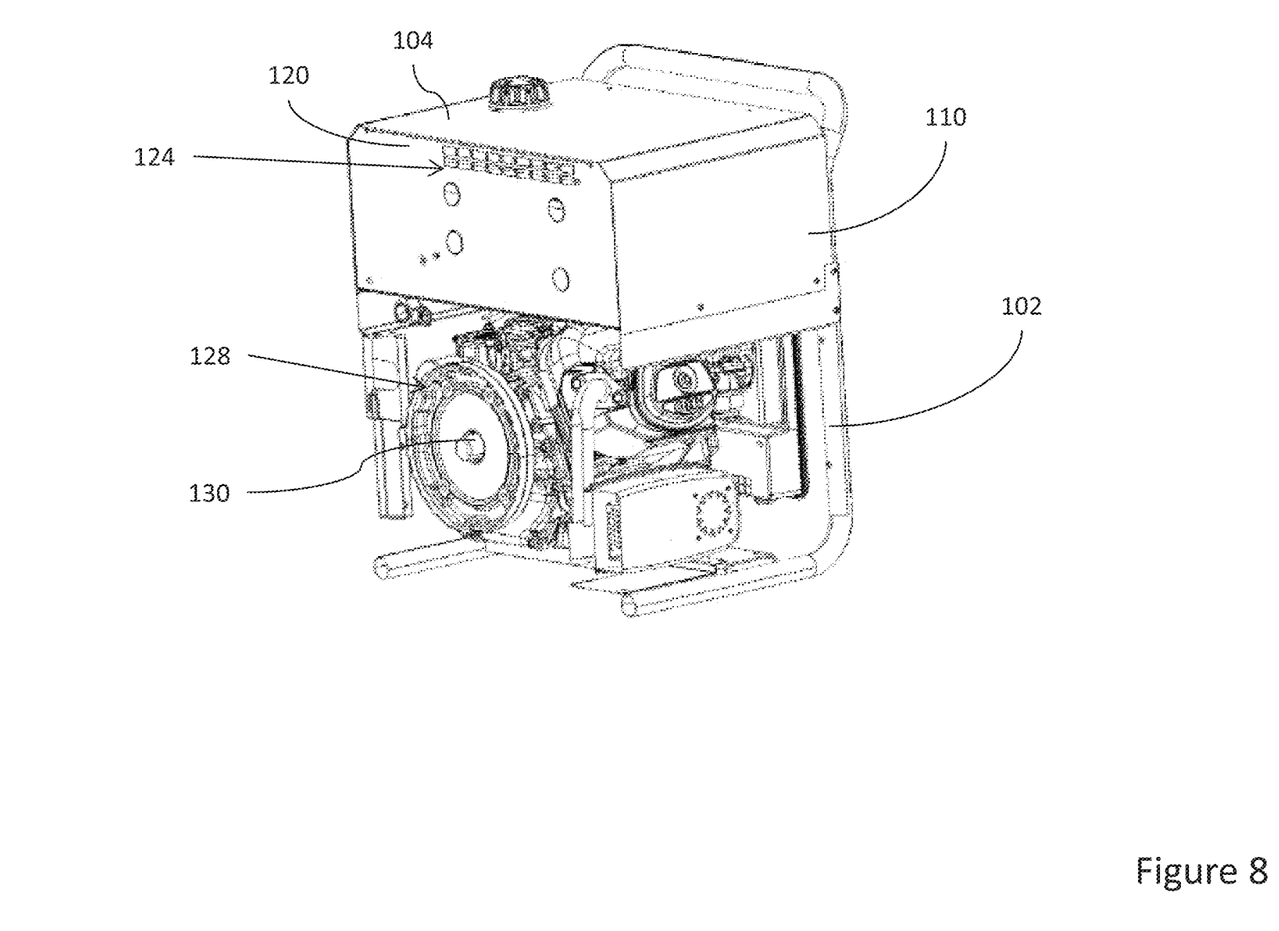
FIG. 8 is a cross section of the engine-driven welding-type power supply of FIG. 1, viewed in perspective.
Figure 11:
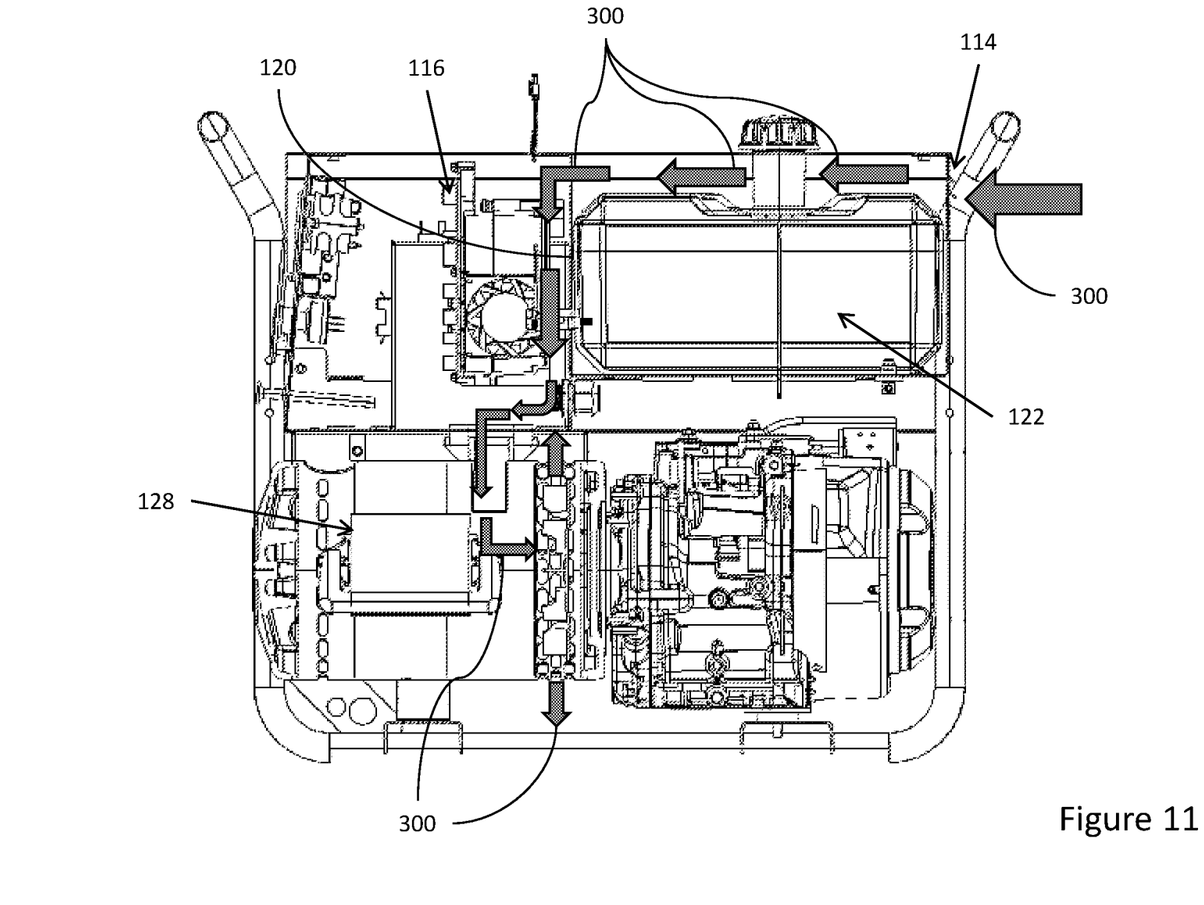
FIG. 11 is a cross section of the engine-driven welding-type power supply of F 1, viewed from the left side.

As shown in FIGS. 8 and 11, a partition 120 substantially divides the interior of the enclosure 104 into a front portion, having the weld module 116, and a rear portion, having a fuel tank 122. In some aspects, the partition 120 may be formed as part of the weld module 116 itself, such as a back wall of the weld module 116, for example. In other aspects, there may be a space between the weld module 116 and the partition 120. The partition 120 may assist in keeping air flowing along the airflow path 200, thereby reducing and/or restricting the amount of air that may veer and/or bleed off the path into another part of the enclosure 104.

As shown in FIG. 8, the partition 120 includes apertures 124. The apertures 124 help to create a second airflow path 300 between the apertures 124 in the partition 120 and the louvers 114 in the rear face 108 of the enclosure. The second airflow path 300 between the apertures 124 in the partition 120 and the louvers 114 in the rear face 108 of the enclosure may be routed through a space in the interior of the enclosure 104 between the enclosure 104 and the top of the fuel tank 122.

The engine-driven welding-type power supply 100 further includes an engine 126 that drives a generator 128 to generate electrical power. More particularly, the engine 126 may produce mechanical power which the generator 128 then converts into electrical power. The generator 128 provides the electrical power to the weld module 116 for conversion to welding-type power.

In the example embodiment illustrated in the figures, the engine 126 and the generator 128 are positioned substantially adjacent to each other and substantially below the enclosure 104. The engine 126 and the generator 128 are also positioned within a perimeter of the welder-generator defined by the outer frame 102. The engine 126 may be an internal combustion engine or a diesel engine, for example. The engine 126 may use fuel from the fuel tank 122 to provide the mechanical power. In the illustrated example of FIG. 11, the fuel tank 122 is positioned substantially within the enclosure 104 and substantially adjacent the rear face 108 of the enclosure 104.

Figure 9:
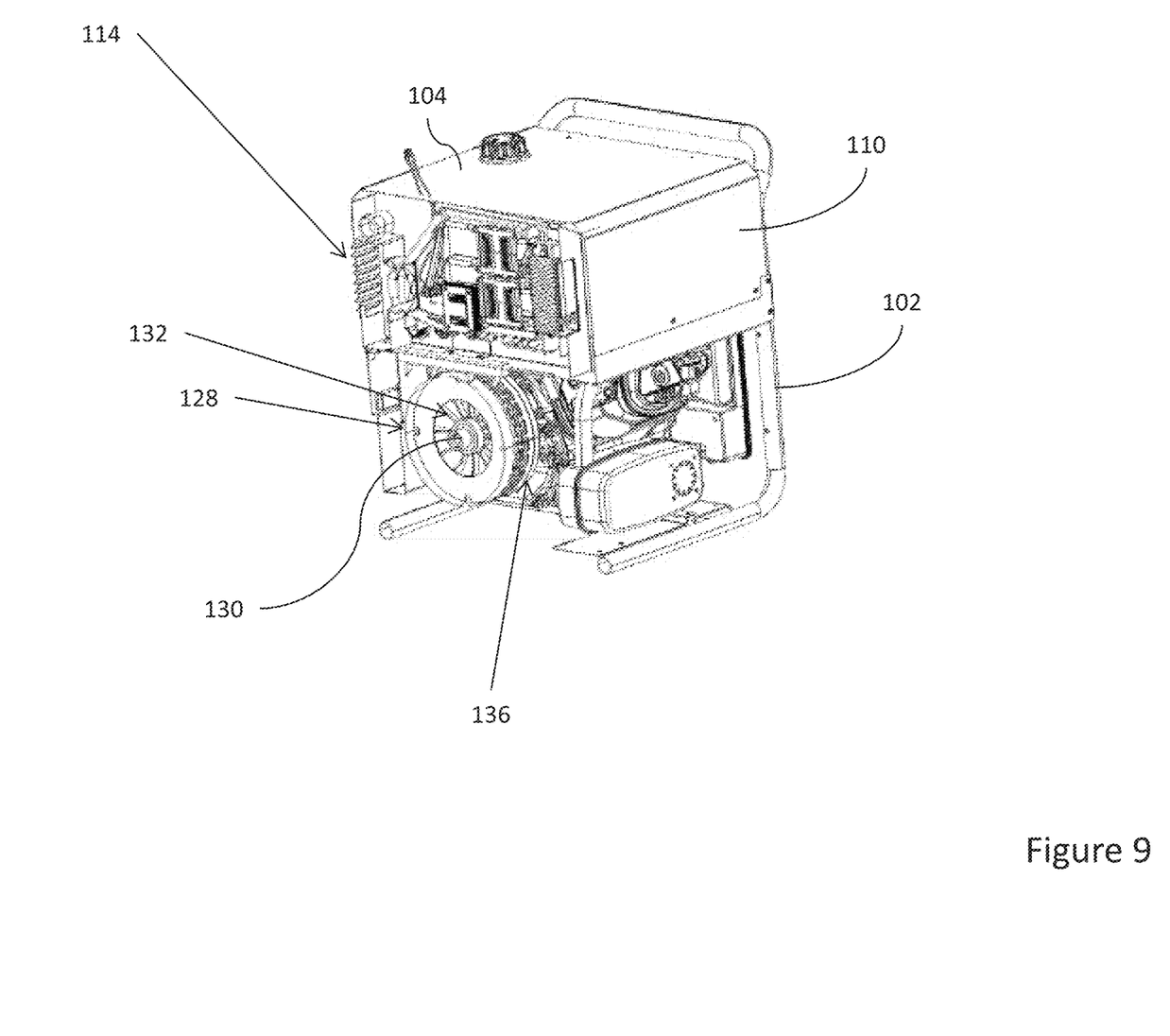
FIG. 9 is another cross section of the engine-driven welding-type power supply of FIG. 1, at a different depth, viewed in perspective.

The engine 126 may produce mechanical power at least partially through providing torque to rotate a rotor 130. The engine 126 and generator 128 are operatively coupled together via the rotor 130, such that the generator 128 may produce electrical power using the rotational movement of the rotor 130. As shown in FIG. 9, a fan 132 is coupled to the rotor 130 at the fan's hub, such that the rotor 130 defines the fan's axis of rotation. Thus, rotation of the rotor 130 may rotate the fan 132 about the fan's axis of rotation (i.e. the rotor 130).

Figure 10:
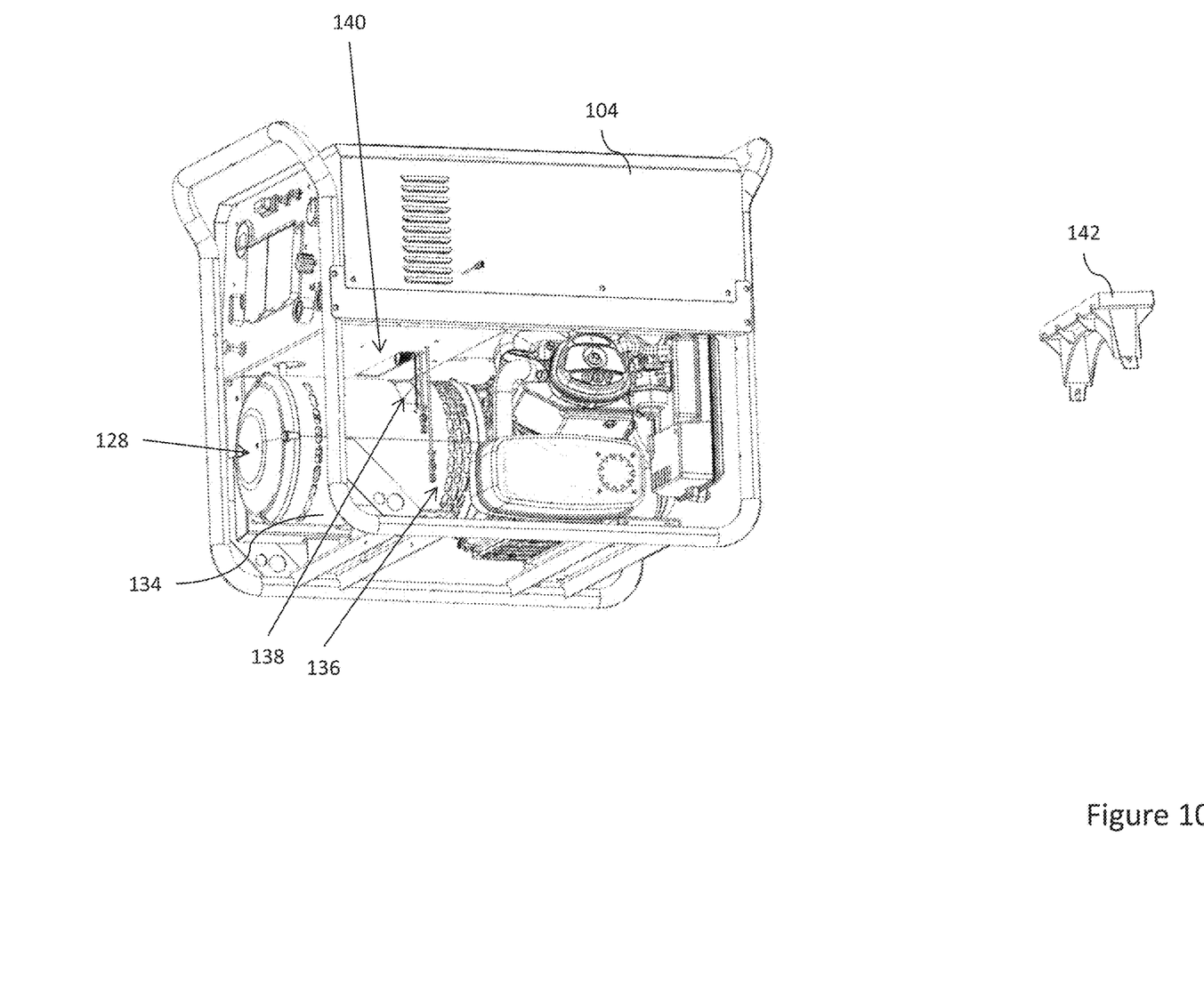
FIG. 10 is a perspective view of the engine-driven welding-type power supply of FIG. 1, with a piece removed.

The generator 128 is positioned within a barrel shaped housing 134. The fan 132 is also positioned within the housing 134. The housing 134 includes a plurality of perforations 136 to allow air to flow. The perforations 136 are substantially radially disposed around the fan 132. As shown in FIG. 10, the housing 134 also includes an opening 138 on its upper surface. The opening 138 is approximately aligned with a matching hole 140 in the bottom of the enclosure 104. The hole 140 in the bottom of the enclosure 104 is positioned substantially below the weld module 116. The opening 138 of the housing 134 is positioned forward of the fan 132 on a suction and/or inlet side of the fan 132. The perforations 136 may be positioned behind the fan 132 on an exhaust and/or exit side and/or aligned with the fan. The housing 134 is coupled to the enclosure 104 with a neck 142 that creates a tunnel (and/or funnel) between the hole 140 and opening 138.

Thus, as shown in FIG. 11, a second airflow path 300 is created between the louvers 114 on the rear face 108 of the enclosure 104 and the barrel housing 134 of the generator 128. When turned by the rotor, the fan 132 may be configured to urge (and/or move, pull, force, suction etc.) along the second airflow path 300. More particularly, the fan 132 urges air in through the louvers 114 on the rear face 108 of the enclosure 104, over the top of the fuel tank 122, through the apertures 124 in the partition 120, adjacent through, and/or across the weld module 116 (and/or heat sinks 117), down through the hole 140 in the bottom of the enclosure 104, through the tunnel created by the neck 142, into the barrel housing 134 of the generator 128 via the opening 138 in the barrel housing 134, and out through the perforations 136 in the barrel housing 134. In some examples, the second airflow path may intake air through louvers (and/or intakes, inlets, vents, openings, grates, griddles, etc.) on the front face 106 of the enclosure 104, and/or on a top of the enclosure 104.

Figure 12:
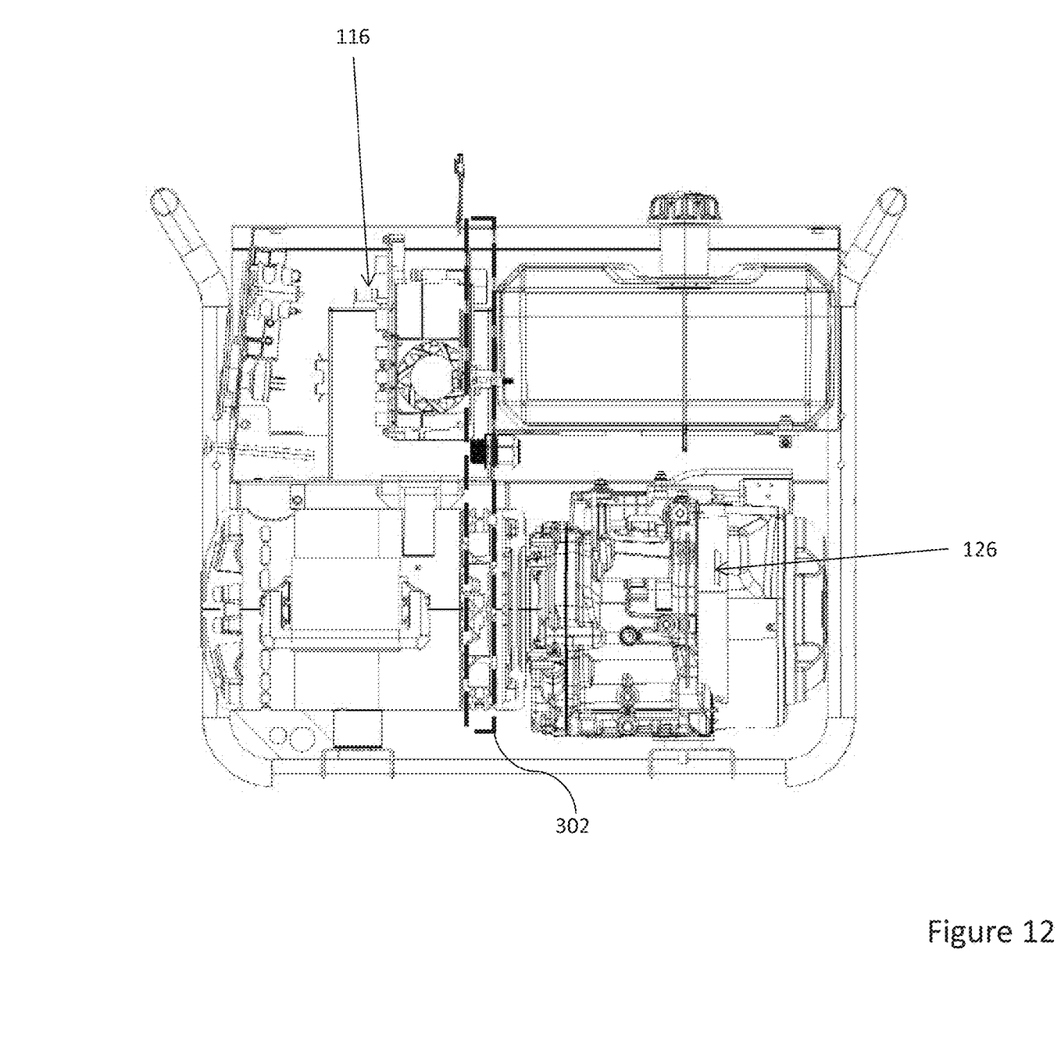
FIG. 12 is the cross section of the engine-driven welding-type power supply of FIG. 11.

As shown in FIG. 12, when air is flowing through both the first airflow path 200 and the second airflow path 300, an air barrier 302 is formed adjacent to and/or around the weld module 116. In particular, the air barrier 302 is created between the weld module 116 and the engine 126 to block heated air from traversing the air barrier 302 toward the weld module 116. The air barrier 302 may be a vortex and/or whirlwind of air flow that continually moves heated air from the interior of the enclosure 104 to the exterior of the enclosure 104, and continually brings cooler, unheated air into the enclosure 104 to replace hot air and to cool the components of the weld module 116. The air barrier 302 thus substantially prevents and/or reduces the transmission of heat to the weld module 116 from the engine 126, for example, and reduces the likelihood that the weld module 116 will overheat and/or exceed its critical temperature.

While examples disclosed with reference to the figures refer to faces of the enclosure 104 as "left side," "right side," "top," "front," "rear," and/or "bottom," these labels are used for convenience and ease of understanding. Disclosed example air intakes and/or air outlets are not necessarily restricted to the disclosed example locations and/or the disclosed faces of the enclosure 104. Rather, any of the air intake(s) and/or air outlet(s) may be rearranged and/or repositioned on the enclosure 104, within the scope of the appended claims. Furthermore, the "left side," "right side," "top," "front," "rear," and/or "bottom," are used with reference to an example orientation of disclosed examples, and the faces may be relabeled as appropriate to a given reference.

White the present method and/or system has been described with reference to certain implementations, it will be understood by those skilled in the art that various changes may be made and equivalents may be substituted without departing from the scope of the present method and/or system. In addition, many modifications may be made to adapt a particular situation or material to the teachings of the present disclosure without departing from its scope. For example, systems, blocks, and/or other components of disclosed examples may be combined, divided, re-arranged, and/or otherwise modified. Therefore, the present method and/or system are not limited to the particular implementations disclosed. Instead, the present method and/or system will include all implementations falling within the scope of the appended claims, both literally and under the doctrine of equivalents.

What is claimed is:

1. An engine-driven welding-type power supply, comprising:
   an engine operatively coupled to a generator via a rotor shaft, wherein the generator is configured to produce an electrical signal;
   weld circuitry, wherein the weld circuitry includes inverter circuitry configured to control characteristics of the electrical signal; and
   a cooling system configured to create an air barrier to block heat generated by operation of the engine from being transmitted to the weld circuitry, wherein the cooling system includes:
      a first fan powered by electrical power routed to the weld circuitry, the first fan being configured to urge air along a first airflow path, wherein at least a portion of the first airflow path is adjacent to the weld circuitry; and
      a second fan configured to rotate about an axis defined by the rotor shaft, the second fan configured to urge air along a second airflow path, wherein at least a portion of the second airflow path is adjacent to the weld circuitry.

2. The engine-driven welding-type power supply of claim 1, wherein the second airflow path is at least partially defined by the generator or the engine.

3. The engine-driven welding-type power supply of claim 1, wherein the first airflow path cools the weld circuitry and the second airflow path creates the air barrier that at least partially shields the weld circuitry from heat produced by the engine.

4. The engine-driven welding-type power supply of claim 1, wherein the weld circuitry is positioned within an enclosure, and the first airflow path extends from a first inlet of the enclosure to a first outlet of the enclosure.

5. The engine-driven welding-type power supply of claim 4, wherein the generator is positioned within a generator housing that is outside of the enclosure, and the second airflow path extends between a second inlet of the enclosure and a second outlet of the generator housing, such that air flowing through the second airflow path cools the generator without increasing a temperature within the enclosure.

6. The engine-driven welding-type power supply of claim 5, wherein the second fan is positioned within the generator housing.

7. The engine-driven welding-type power supply of claim 5, wherein the second outlet comprises perforations in the generator housing that lead to an ambient environment, allowing air flowing through the second airflow path to exit into the ambient environment through the perforations.

8. A power system having an improved airflow, comprising:
   an enclosure; an engine; a fuel tank;
   a generator operatively coupled to the engine via a rotor shaft, the generator configured to produce power;
   weld power conversion circuitry disposed within the enclosure and configured to convert generator power to welding-type power;
   a first airflow path at least partially defined by the enclosure, wherein the first airflow path extends from a first inlet positioned at a first location in the enclosure to a first outlet positioned at a second location in the enclosure;
   a first fan operatively coupled to the weld power conversion circuitry, the first fan configured to urge air through the first airflow path;
   a second airflow path at least partially defined by the enclosure, wherein the second airflow path extends from a second inlet positioned at a third location in the enclosure to a second outlet positioned at a fourth location; and
   a second fan configured to rotate about an axis defined by the rotor shaft, the second fan configured to urge air through the second airflow path.

9. The power system of claim 8, wherein the second airflow path is at least partially defined by the generator or the engine.

10. The power system of claim 8, wherein both the first and second airflow paths pass adjacent to the weld power conversion circuitry.

11. The power system of claim 8, wherein the first location is a sidewall of the enclosure and the second location is an opposite sidewall of the enclosure.

12. The power system of claim 11, wherein the third location is a front wall of the enclosure, a rear wall of the enclosure, or a top of the enclosure.

13. The power system of claim 8, wherein the second airflow path routes air adjacent to the fuel tank, adjacent to the weld power conversion circuitry, and through the generator.

14. The power system of claim 8, wherein the second airflow path routes air adjacent to the fuel tank, adjacent to the weld power conversion circuitry, and through the generator, in order.

15. The power system of claim 8, wherein the generator is positioned within a generator housing that is outside of the enclosure, and the second outlet of the second airflow path is an outlet of the generator housing, such that air flowing through the second airflow path cools the generator without increasing a temperature within the enclosure.

16. The power system of claim 15, wherein the second fan is positioned within the generator housing.

17. The power system of claim 16, wherein the second outlet comprises perforations in the generator housing that lead to an ambient environment, allowing air flowing through the second airflow path to exit into the ambient environment through the perforations.

18. The power system of claim 8, wherein the first airflow path is configured to cool the weld power conversion circuitry.

19. The power system of claim 18, wherein the first airflow path extends through a wind tunnel.

20. The power system of claim 19, wherein the wind tunnel separates the first airflow path from the second airflow path.

* * * * *